(12) United States Patent
Yang et al.

(10) Patent No.: US 7,768,995 B2
(45) Date of Patent: Aug. 3, 2010

(54) TECHNIQUES FOR ONE-WAY SYNCHRONIZATION OF ROUTING INFORMATION AMONG INTERMEDIATE NODES

(75) Inventors: Yi Yang, Morrisville, NC (US); Thuan Van Tran, Cary, NC (US); Alvaro Retana, Raleigh, NC (US); Donnie Van Savage, Raleigh, NC (US); James Ng, Mebane, NC (US); Russell White, Holly Springs, NC (US)

(73) Assignee: Cisco Technology, Inc., San Jose, CA (US)

(*) Notice: Subject to any disclaimer, the term of this patent is extended or adjusted under 35 U.S.C. 154(b) by 370 days.

(21) Appl. No.: 11/497,224

(22) Filed: Aug. 1, 2006

(65) Prior Publication Data

US 2008/0031236 A1 Feb. 7, 2008

(51) Int. Cl.
H04L 12/28 (2006.01)
H04L 12/56 (2006.01)
(52) U.S. Cl. .................. 370/351; 370/395.62; 370/400
(58) Field of Classification Search .................. None
See application file for complete search history.

(56) References Cited

U.S. PATENT DOCUMENTS

| 5,265,092 | A | 11/1993 | Soloway et al. |
| 6,202,079 | B1 | 3/2001 | Banks |
| 6,876,625 | B1 | 4/2005 | McAllister et al. |
| 6,938,095 | B2 * | 8/2005 | Basturk et al. ............ 709/238 |
| 6,947,963 | B1 * | 9/2005 | Agarwal et al. ............ 709/201 |
| 7,007,100 | B1 | 2/2006 | Doong et al. |
| 2005/0047406 | A1 * | 3/2005 | Hares ........................ 370/389 |
| 2006/0179158 | A1 * | 8/2006 | Randriamasy et al. ...... 709/238 |

FOREIGN PATENT DOCUMENTS

| CN | 101495997 A | 7/2009 |
| WO | 2008/016732 A2 | 2/2008 |

OTHER PUBLICATIONS

International Search Report mailed Apr. 9, 2008 for International Application No. PCT/US07/067352 (WO 2008/016732 A3), 2 pages.
International Preliminary Report on Patentability issued Feb. 3, 2009 and Written Opinion of the International Searching Authority mailed Apr. 9, 2008 for International Application No. PCT/US07/067352 (WO 2008/016732 A2), 8 pages.
Chinese Patent Application No. 200780027746.X, The First Office Action, issued Apr. 13, 2010, 7 pages.

* cited by examiner

Primary Examiner—Ayaz R Sheikh
Assistant Examiner—Blanche Wong
(74) Attorney, Agent, or Firm—Patent Capital Group (57) ABSTRACT

Techniques for synchronizing routing data include determining whether conditions are satisfied for one-way transfer with an adjacent router. If it is determined that conditions are satisfied for one-way transfer of routing table data with the adjacent router, then a refresh-notice message is sent from the initiating router to the adjacent router. The refresh-notice message includes data that indicates a particular direction for transfer of routing table data. If the particular direction is inbound, then a copy of an adjacent routing table is received without sending a copy of the initiating router's own routing table. If the particular direction is outbound, then a copy of the own routing table is sent without receiving a copy of the adjacent routing table.

31 Claims, 7 Drawing Sheets

TECHNIQUES FOR ONE-WAY SYNCHRONIZATION OF ROUTING INFORMATION AMONG INTERMEDIATE NODES

BACKGROUND OF THE INVENTION

1. Field of the Invention

The present invention relates to synchronizing routing information among multiple intermediate network nodes; and in particular to avoiding two-way synchronization in certain cases.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a network node that is configured to originate or terminate communications over the network. An intermediate network node facilitates the passage of data between end nodes.

Communications between nodes are typically effected by exchanging discrete packets of data. Information is exchanged within data packets (also called messages herein) according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. The header includes information such as the source of the packet, its destination, the length of the payload, and other properties used by the protocol. Often, the data in the payload for the particular protocol includes a header and payload for a different protocol associated with a different layer of detail for information exchange.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are intermediate network nodes that determine which communication link or links to employ to support the progress of data packets through the network. A network node that determines which links to employ based on information in the internetwork header (layer 3) is called a router.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A routing protocol only exchanges control plane messages used for routing data packets sent in a different routed protocol (e.g., IP). A portion of a network under the network administration of a single authority, such as an enterprise or Internet service provider (ISP) is called a domain or an autonomous system (AS). To reduce the consumption of network resources and improve scalability, some routing protocols send only summarized routing information. Routing information for an AS is summarized at its boundaries with one or more other ASs at intermediate network nodes called border gateway nodes or border gateway (BG) routers. Routing information shared within the borders of one AS is exchanged using an interior gateway protocol (IGP). Example IGPs include the link state protocols such as the intermediate system to intermediate system (IS-IS) protocol and the open shortest path first (OSPF) protocol. Another IGP, developed by Cisco Systems of San Jose, Calif. for use in its routers, is the Enhanced Interior Gateway Routing Protocol (EIGRP). Some of the link-state protocols divide an autonomous system into multiple areas, flood all data for a unified routing database within an area, but send only summarized information between areas. Some IGPs, like EIGRP, send only summary information from each intermediate network node in the autonomous system.

After a topology or configuration change, for example, when a central processing unit (CPU) in a router fails and is replaced by a standby CPU, an EIGRP router resynchronizes its information about network topology using a graceful restart (GRS) procedure. The network topology information indicates what destination nodes can be reached through which routers in the network. The EIGRP use a vector metric to determine the cost of reaching any destination from any router, and that cost is included with the topology information in routing tables, a portion of which reside at each router. With the GRS procedure, the routers in the network can continue to forward messages for several seconds while the changed router updates its information about network topology and passes that information to affected routers. The procedure provides a feature called non-stop forwarding (NSF).

According to the GRS, a router that has detected a configuration or topology change initializes the GRS by sending an UPDATE message for the protocol (e.g., an EIGRP UPDATE message) with a restart synchronization (RS) bit ON and an initiating (INIT) bit ON to indicate a graceful restart is being started by that router (the initiating router). Neighboring routers (also called "peers') that receive this UPDATE message acknowledge the graceful restart with an UPDATE message in which the RS bit is ON but not the INIT bit. After the exchange of these two UPDATE messages, both the initiating router and the neighboring routers send the full topology table with vector metrics that each has stored locally. The topology table with vector metrics, called herein the routing table data, is exchanged using two-way (bi-directional) transfer of each node's entire routing table data during the synchronization (also called a "refresh", a "restart synchronization" and a "re-synchronization" herein).

While suitable for GRS and NSF, there are some disadvantages of this approach. There are circumstances in which it is not necessary to send routing table data in both directions. Currently, EIGRP uses GRS with full, two-way transfer of routing tables even in these circumstances.

For example, when filters change at one router, only routing table data from one or more routers need to be exchanged, not all routing table data from all neighbors. A filter is a configured process at a router by which details of several routes are summarized ("aggregated") to a particular degree before being advertised to other routers. A router can have an inbound filter, which is used to ignore advertisements for certain destinations from certain neighbors. A router can also have an outbound filter, which is used to prevent the advertisement of certain destinations to certain neighbors.

In addition, a router might be configured for aggregation by which a single routing advertisement is substituted for multiple other routing advertisements. This is similar to an outbound filter in being different for inbound and outbound advertisements, but differs from filtering in that rather than preventing a route from being advertised, a different route is advertised in place of a set of routes.

When inbound route filters change, there is no reason for a router to send again its routing table to its neighbors, because the outbound routes have not changed. Similarly, when an outbound filter or aggregation changes, it is desirable for the reconfigured router to send the entire new routing table to the one or two neighbors affected by the aggregation. However, those neighbors' routing tables have not changed, and there is no reason for a router to receive each neighbor's routing table. It is burdensome for the routers individually, and the network as a whole, to expend processing and communication bandwidth so that one or more neighbors respond to the update by sending all their routing table data. Network performance is noticeably affected by such unnecessary transfers.

Similarly, when an inbound filter changes, it is desirable for the reconfigured router to receive the entire routing tables from the one or two neighbors affected by the filter change. However, the router's own routing table has not changed, and it is burdensome for the routers individually, and the network as a whole, to expend processing and communication bandwidth so that the router with the changed filter participates in the update by sending its routing table data to all its neighbors. Network performance is noticeably affected by such unnecessary transfers.

Based on the foregoing, there is a clear need for techniques for synchronizing routing information between neighboring routers that do not involve two-way transfers with all neighbors.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described for synchronizing routing table data among neighbors in a packet-switched communications network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, embodiments of the invention are described in the context of synchronizing routing table data between neighboring routers using EIGRP within an autonomous system. However, the invention is not limited to this context and protocol, but may be applied in any routing protocol that occasionally synchronizes routing table data between neighbors for computing a vector metric in advertised routes.

1.0 Network Overview

Figure 1A:
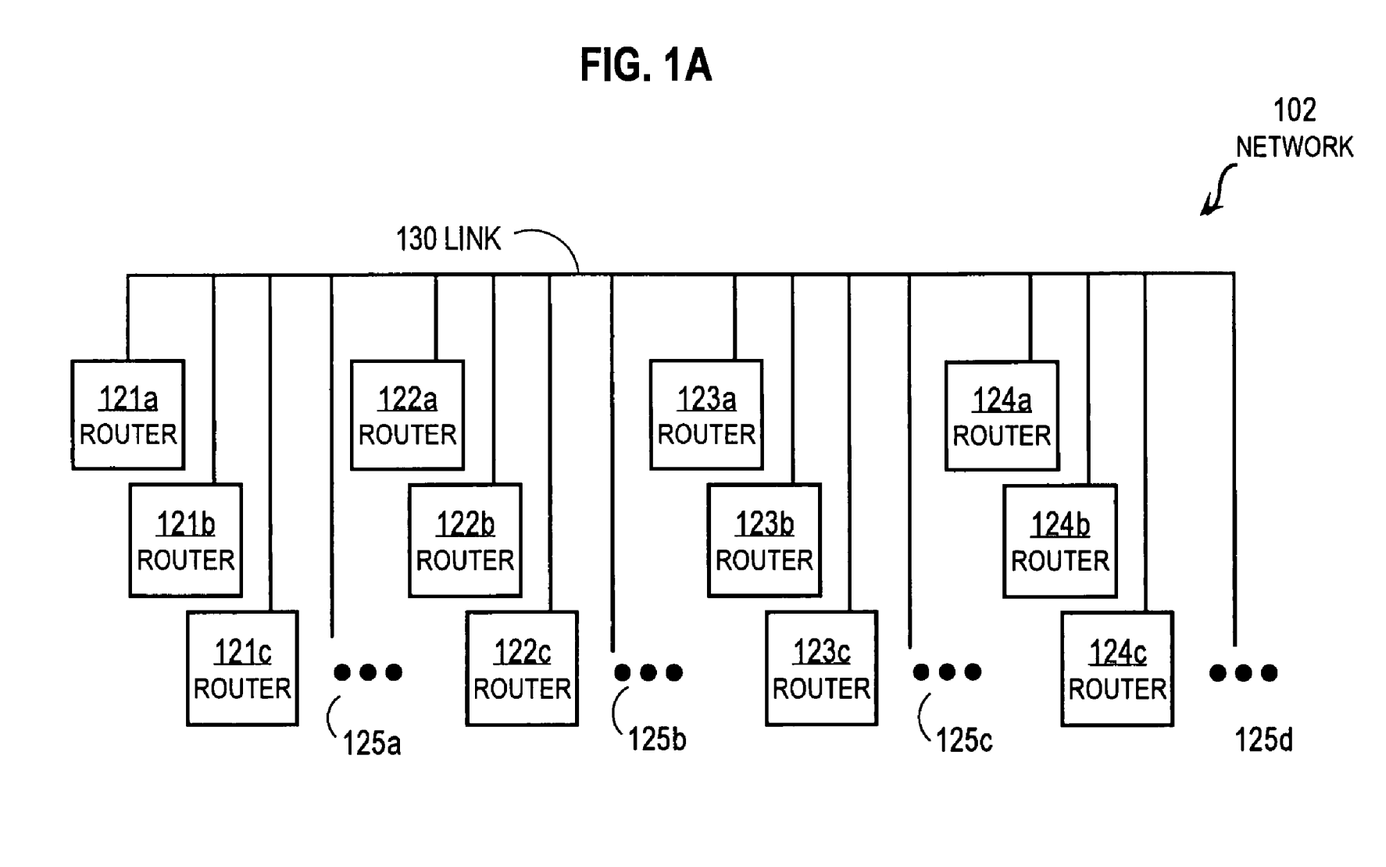
FIG. 1A is a block diagram that illustrates a portion of a network that includes a large number of neighboring routers, according to an embodiment.

FIG. 1A is a block diagram that illustrates a portion of a network 102 that includes a large number of neighboring routers, according to an embodiment. Network 102 includes a large number of intermediate network nodes: router 121a, router 121b, router 121c, router 122a, router 122b, router 122c, router 123a, router 123b, router 123c, router 124a, router 124b, router 124c and further routers represented by ellipses 125a, 125b, 125c, 125d, collectively referenced hereinafter as routers 120. The routers 120 are connected by communication links 130 on which there are no intervening intermediate network nodes (called a network segment). Thus routers 120 are neighbors. While a certain number of nodes 120 and links 130 are depicted in network 102 for purposes of illustration, in other embodiments, a network includes more or fewer nodes, such as routers and end nodes that are either neighbors or not neighbors of routers 120, and more or fewer links.

A message sent by one neighbor, e.g., router 121a may incur a variable amount of cost to reach each of the other neighboring routers 120 on network segment made up of links 130. Cost can be measured in any manner known in the art including bandwidth, travel time, signal attenuation and susceptibility to noise, among others, or any combination of such factors. Due to noise or congestion on the segment, some routers may not receive the message at all For purposes of illustration it is assumed that the cost to reach a neighbor of router 121a is measured in round trip travel time, and increases with distance to the right from router 121a in FIG. 1A. It is assumed that all routers indicated by ellipses 125a are closer than router 122a to router 121a. Similarly, it is assumed that all routers indicated by ellipses 125b, 125c are closer than routers 123a, 124a, respectively, to router 121a. When a reliable message is sent by router 121a to any or all of its neighboring routers 120, the neighboring routers 120 return an ACK message.

Figure 1B:
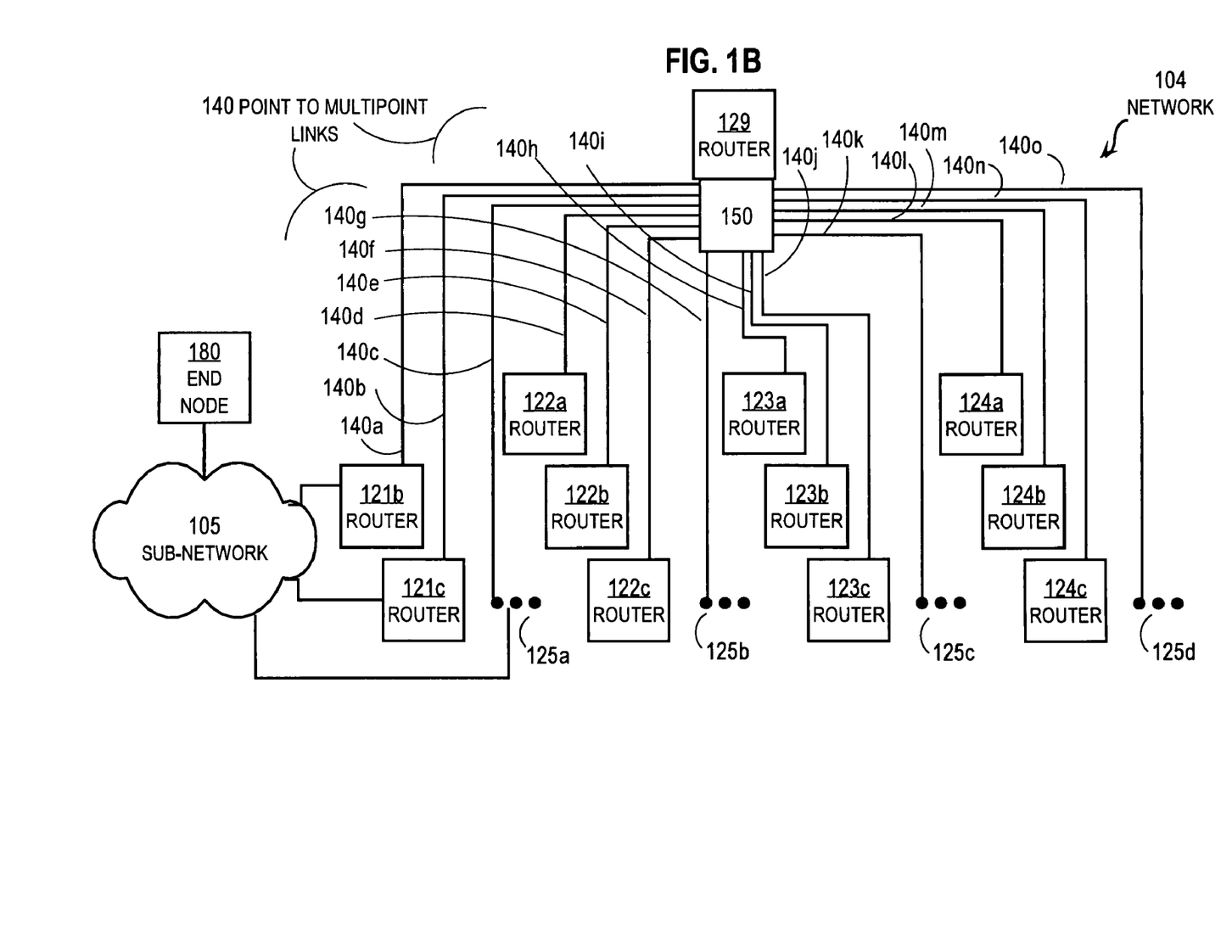
FIG. 1B is a block diagram that illustrates a portion of a network that includes a large number of neighboring routers on a point to multi-point link, according to an embodiment.

FIG. 1B is a block diagram that illustrates a portion of a network 104 that includes a large number of neighboring routers on a point to multi-point link, according to an embodiment. In network 104 router 121a of network 102 is replaced by router 129 with a point to multipoint interface 150. The links 130 are replaced by point to multipoint links 140 to the remaining routers 120 of network 102. In the illustrated embodiment, the point-to-multipoint links include link 140a, link 140b, link 140c, link 140d, link 140e, link 140f, link 140g, link 140h, link 140i, link 140j, link 140k, link 140l, link 140m, link 140n, and link 140o. Unlike network 102, in which each router 120 has a thousand neighbors, in network 104 only router 129 has a thousand neighbors. The other routers 120 each have just a few neighbors. Links 140 form a network segment. Network 104 also includes sub-network 105 connected to end node 180 and links between sub-network 105 and neighboring routers 121b, 121c, and routers indicated by ellipsis 125a.

As described in the background section, EIGRP allows an initiating router (e.g., router 121a or router 129) to re-synchronize its routing data with all its neighbors by sending an EIGRP UPDATE message with an RS bit ON and an INIT bit ON. In the following, for simplicity of explanation, a bit is considered ON when it holds the binary value 1 and not ON (i.e., OFF) when it holds the binary value 0. In other embodiments, other values may be used to specify when a field with one or more bits is ON or OFF. In response to receiving the UPDATE message with RS bit ON and INIT bit ON, each neighbor responds with an UPDATE message in which the RS bit is ON but the INIT bit is OFF which serves as the acknowledgement (ACK) message. After this exchange of messages, each router begins to send its entire routing data topology (e.g., routing table data), the initiating router sends all its routing table data to all its neighbors and each neighbor sends all its routing table data to the initiating router, in full two-way transfer of all routing information, i.e. a two-way refresh.

According to various illustrated embodiments of the invention, as described in more detail in the following sections, an initiating router determines a subset of neighbors (from one neighbor up to all neighbors, inclusive) and sends an EIGRP UPDATE message that indicates a one-way direction for transfer of routing data to the subset of neighbors.

In response to receiving the UPDATE message with the one-way direction indicated, in the illustrated embodiment, each receiving neighbor that supports one-way transfer responds with an UPDATE message in which the one-way direction is also indicated.

One-way transfer then begins, with one router transferring all its routing data to the other but receiving none in return. This reduces the consumption of processing and communication bandwidth resources during this kind of re-synchronization, compared to, two-way transfer during the default re-synchronization used in earlier versions of the protocol (e.g., earlier versions of EIGRP).

In some embodiments, to be backward compatible with a neighbor that uses an older version of the protocol (e.g., EIGRP) that does not support one-way transfer during synchronization, the UPDATE message from that neighbor does not indicate the one-way direction. In this case, the initiating router engages in the default re-synchronization, which includes two-way transfer of routing table data.

2.0 Data Structures for Routing Information

Figure 2A:
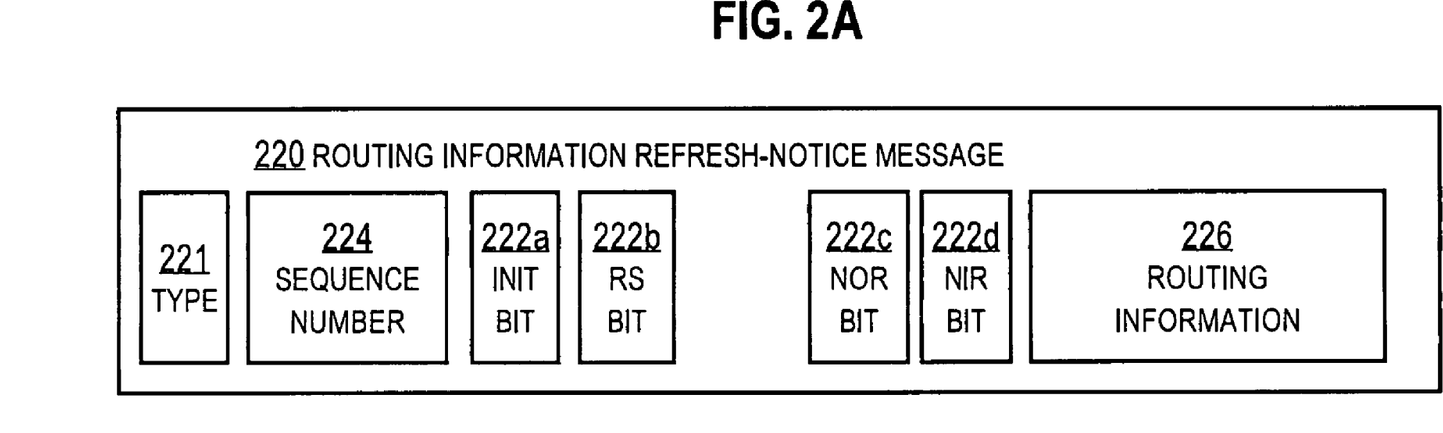
FIG. 2A is a block diagram that illustrates a control plane update message that serves as a refresh-notice message for initiating a refresh of routing data, according to an embodiment.

FIG. 2A is a block diagram that illustrates a control plane update message, such as a modified EIGRP UPDATE message, that serves as a refresh-notice message 220 for initiating a refresh of routing data, according to an embodiment. Refresh-notice message 220 includes an update type field 221, a sequence number field 224, an INIT bit field 222a, a RS bit field 222b, a NOR bit field 222c, a NIR bit field 222d, and routing information fields 226, among others not shown. A bit is a binary digit. Although message 220 (and message 230 described below with reference to FIG. 2B) is shown as an integral block with contiguous fields in a particular order for purposes of illustration, in other embodiments one or more portions of these fields are positioned in a different order or omitted The type field 221 holds data that indicates the type of message 220. For example, the type field 221 holds data that indicates an EIGRP UPDATE message type so that the order and size of following fields are known by the receiving router to follow the EIGRP protocol for UPDATE messages.

The sequence number field 224 holds data that indicates the order of the message 220 in a series of messages used to convey routing information, such as the cumulative number of bytes (1 byte typically equals 8 bits) of the entire update included in the current message 220. The routing update information is often properly processed in the order it is sent. The contents of the sequence number field ensure that the recipient router can determine the proper sequence for processing the routing update information and detect the loss of any bytes.

The INIT bit field 222a holds a bit that is ON to indicate the update message is initiating a process, such as an update, a query or a refresh. In other embodiments, the field 222a holds more than one bit. The RS bit field 222b holds a bit that is ON to indicate the update message is for a refresh process (i.e., a process to restart synchronization of routing table data). In other embodiments, the field 222b holds more than one bit. The use of INIT bit field 222a and RS bit field 222b for two-way refresh is described above in the background section.

According to the illustrated embodiments, refresh-notice message 220 includes NOR bit field 222c and NIR bit field 222d. Either the NOR bit field or the NIR bit field is ON to indicate one-way transfer of routing table data during refresh. The NOR bit field 222c indicates transfer in one direction between initiating router and neighbor, and the NIR bit field 222d indicates the opposite direction.

For backward compatibility in these embodiments, the positions of NOR bit field 222c and NIR bit field 222e are selected among positions of message 220 that are not used in preceding versions of the protocol. For example, in some embodiments the fields 222c, 222d are positioned in an area that is reserved in preceding versions. In some embodiments the fields 222c, 222d are positioned in a list of length, attribute, value triplets supported by the previous protocol with one or more new values for the attribute that are not defined for the preceding version. The ON values for NOR bit field 222c and NIR bit field 222d are chosen to distinguish from the absence of these fields in preceding versions of the protocol. For purposes of illustration, it is assumed that the values in the reserved area are all zero in the preceding version of the protocol. Therefore, in the illustrated embodiment, the ON values for the NOR bit and the NIR bit are selected to be the binary value 1. In the illustrated embodiment, the NOR bit and NIR bit are named so that when they are not set, default two-way refresh is performed—compatible with routers that implement the preceding version of the protocol. The NOR bit is ON to indicate "No Outbound Refresh" from the point of view of the initiating router that sends message 220. The NIR bit is ON to indicate "No Inbound Refresh" from the point of view of the initiating router that sends message 220.

The routing information field 226 holds data that indicates the next portion of the routing information, such as a routing table update, or routing query information, or a first portion of a complete routing table to be sent from the initiating router, if any.

Figure 2B:
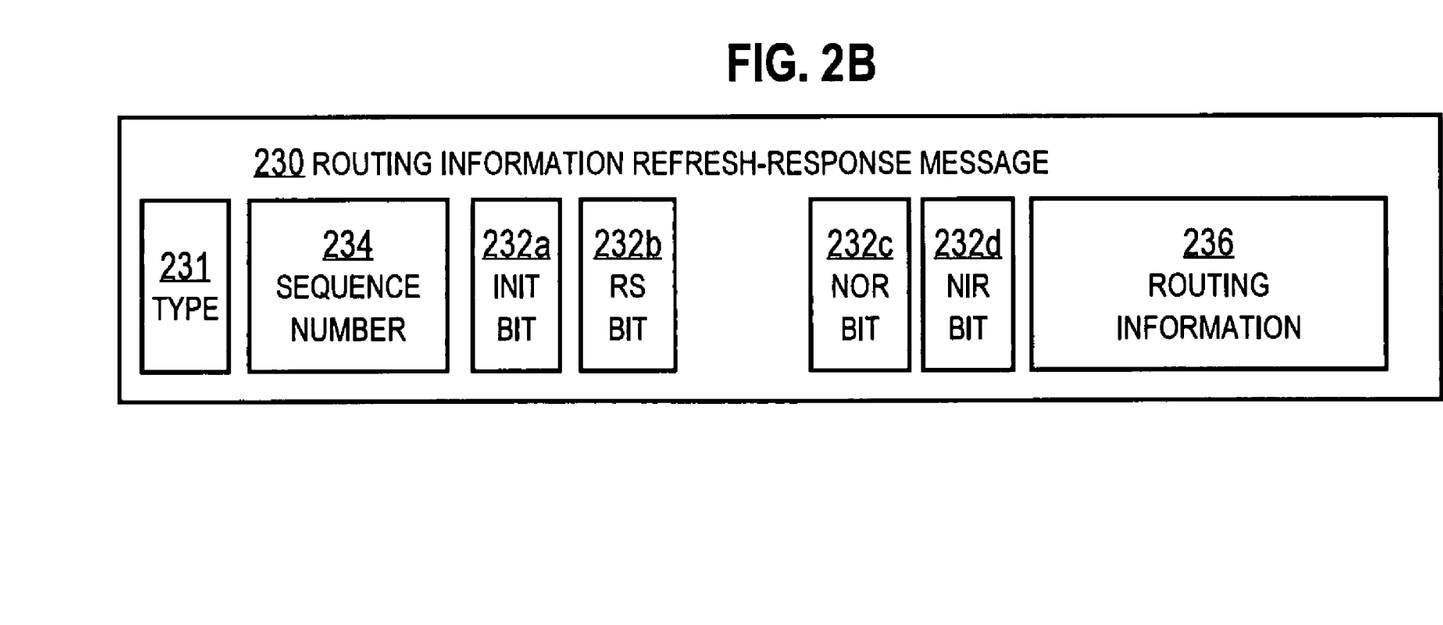
FIG. 2B is a block diagram that illustrates a control plane update message that serves as a refresh-response message for responding to a refresh-notice message, according to an embodiment.

FIG. 2B is a block diagram that illustrates a control plane update message, such as a modified EIGRP UPDATE message, that serves as a refresh-response message 230 for responding to a refresh-notice message, according to an embodiment. Refresh-response message 230 includes an update type field 231, a sequence number field 234, an INIT bit field 232a, a RS bit field 232b, a NOR bit field 232c, a NIR bit field 232d, and routing information fields 236, among others, not shown.

The type field 231 holds data that indicates the type of message 230. For example, the type field 231 holds data that indicates an EIGRP UPDATE message type so that the order and size of following fields are known by the receiving router to follow the EIGRP protocol for UPDATE messages.

The sequence number field 234 holds data that indicates the order of the message 230 in a series of messages used to convey routing information, such as the cumulative number of bytes of the entire update included in the current message 230 from the router sending message 230. The contents of the sequence number field 234 ensure that the recipient router can determine the proper sequence for processing the routing update information and detect the loss of any bytes.

The INIT bit field 232a holds a bit that indicates the UPDATE message is initiating a process, such as an update, a query or a refresh. In other embodiments, the field 232a holds more than one bit. The RS bit field 232b holds a bit that indicates the UPDATE message is for a refresh process (i.e., a restart synchronization process). In other embodiments, the field 232b holds more than one bit. The use of INIT bit field 232a and RS bit field 232b for two-way refresh is described above in the background section. In the illustrated embodiment, in the refresh-response message 230 the INIT bit is OFF (e.g., the INIT bit value is binary 0), and the RS bit is ON (e.g., the RS bit value is binary 1) in a refresh-response message 230.

According to the illustrated embodiments, refresh-response message 230 includes NOR bit field 232c and NIR bit field 232d. Either the NOR bit field or the NIR bit field is ON to indicate one-way transfer of routing table data during refresh. The NOR bit field 232c indicates transfer in one direction between sending router and neighbor, and the NIR bit field 232d indicates the opposite direction.

For backward compatibility in these embodiments, the positions of NOR bit field 232c and NIR bit field 222e are selected among positions of message 230 that are not used in preceding versions of the protocol, as described above for refresh-notice message 220. The NOR bit is ON to indicate "No Outbound Refresh" from the point of view of the neighbor sending message 230. The NIR bit is ON to indicate "No Inbound Refresh" from the point of view of the neighbor sending message 230.

The routing information field 236 holds data that indicates the next portion of the routing information, such as a routing table update, or routing query response information, or a first portion of a complete routing table to be sent from the neighboring router, if any.

Figure 3:
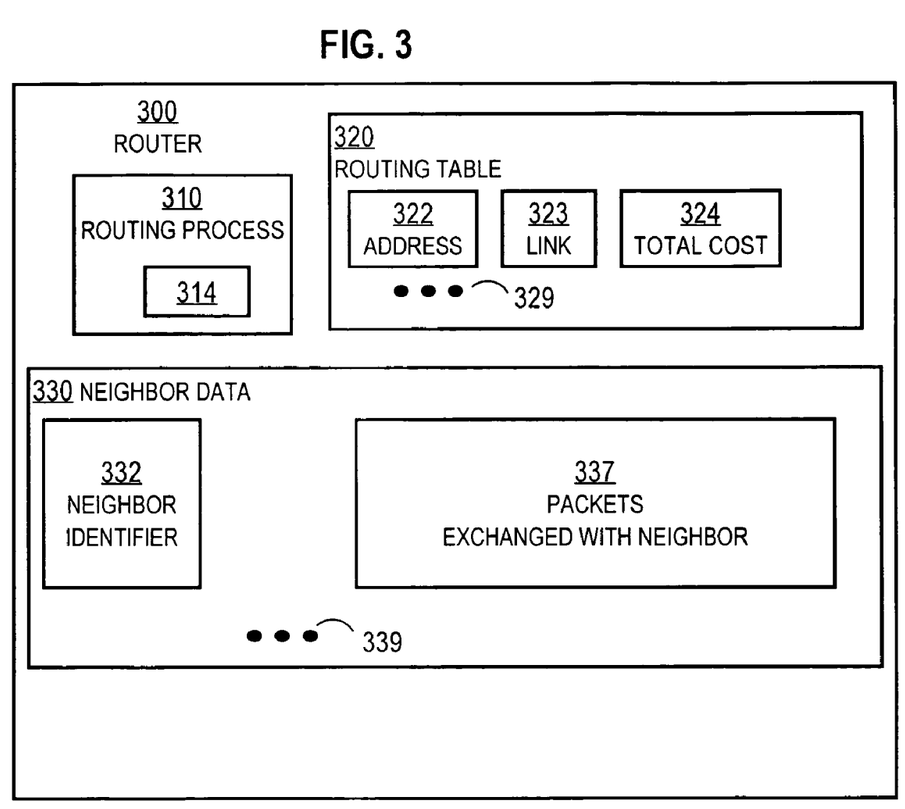
FIG. 3 is a block diagram that illustrates a router that uses the control plane messages depicted in FIG. 2A and 2B, according to an embodiment.

FIG. 3 is a block diagram that illustrates a router that uses the control plane messages depicted in FIG. 2A and FIG. 2B, according to an embodiment. Router 300 includes a routing process 310, a routing table 320 and a neighbor data structure 330.

The routing process 310 executes on a processor, such as a general purpose processor executing sequences of instructions that cause the processor to perform the routing process. According to embodiments of the invention, routing process includes process 314 to support one-way transfer during refresh, as described in more detail below with respect to FIG. 4A and FIG. 4B. The routing process 310 stores and retrieves information in the routing table 320 based on information received in one or more routing protocol update or refresh messages that are stored in routing protocol information data structures (including neighbor data structure 330 among others, not shown).

The routing table 320 is a data structure that includes for each destination that can be reached from the router 300, an address field 322, a link field 323 and zero or more attribute fields. In the illustrated embodiment, the attributes fields include a total cost field 324. The address field 322 holds data that indicates a destination address or range of addresses that can be reached by router 300, e.g., an IP address for end node 180 or sub-network 105. The link field 323 indicates a link on router 300 that is used as the next hop to reach the destination address indicated in field 322. For example, link 140a with router 121b is the link for the next hop from router 129 to end node 180 and data indicating link 140a is included in link field 323. The total cost field 324 holds data that indicates a cost metric to reach the destination address from router 300. Fields for other destinations in routing table 320 are indicated by ellipsis 329.

The neighbor data structure 330 is a data structure that holds data that describes each neighbor of the router 300. In the illustrated embodiment, neighbor data structure 330 includes, for each neighbor, a neighbor identifier field 332 and information about packets exchanged with the neighbor field 337. In some embodiments, other data fields (not shown) are also associated with each neighbor. Fields for other neighbors are indicated by ellipsis 339.

The neighbor identifier field 332 holds data that indicates a particular neighboring router, e.g., an IP address for that particular neighbor. The information about packets exchanged with the neighbor field 337 holds data that indicates a queue of routing information and sequence numbers that are exchanged with the particular neighbor indicated in field 332. In various embodiments, the queue itself, or a pointer to a memory location that contains the queue, is included in field 337. If not acknowledged in time, the data in this queue can be sent again to that neighbor.

Data structures may be formed in any method known in the art, including using portions of volatile memory, or non-volatile storage on one or more nodes, in one or more files or in one or more databases accessed through a database server, or some combination. Although data structures 320, 330 are shown as integral blocks with contiguous fields in a particular order for purposes of illustration, in other embodiments one or more portions of fields and data structures 320, 330 are stored as separate data structures in the same or different order on the same or different multiple nodes that perform the functions of router 300.

According to various embodiments of the invention, router 300 initiates or responds to refresh-notice and refresh-response messages that support one-way transfer of routing data, or some combination.

3.0 Method for One-Way Refresh

Figure 4A:
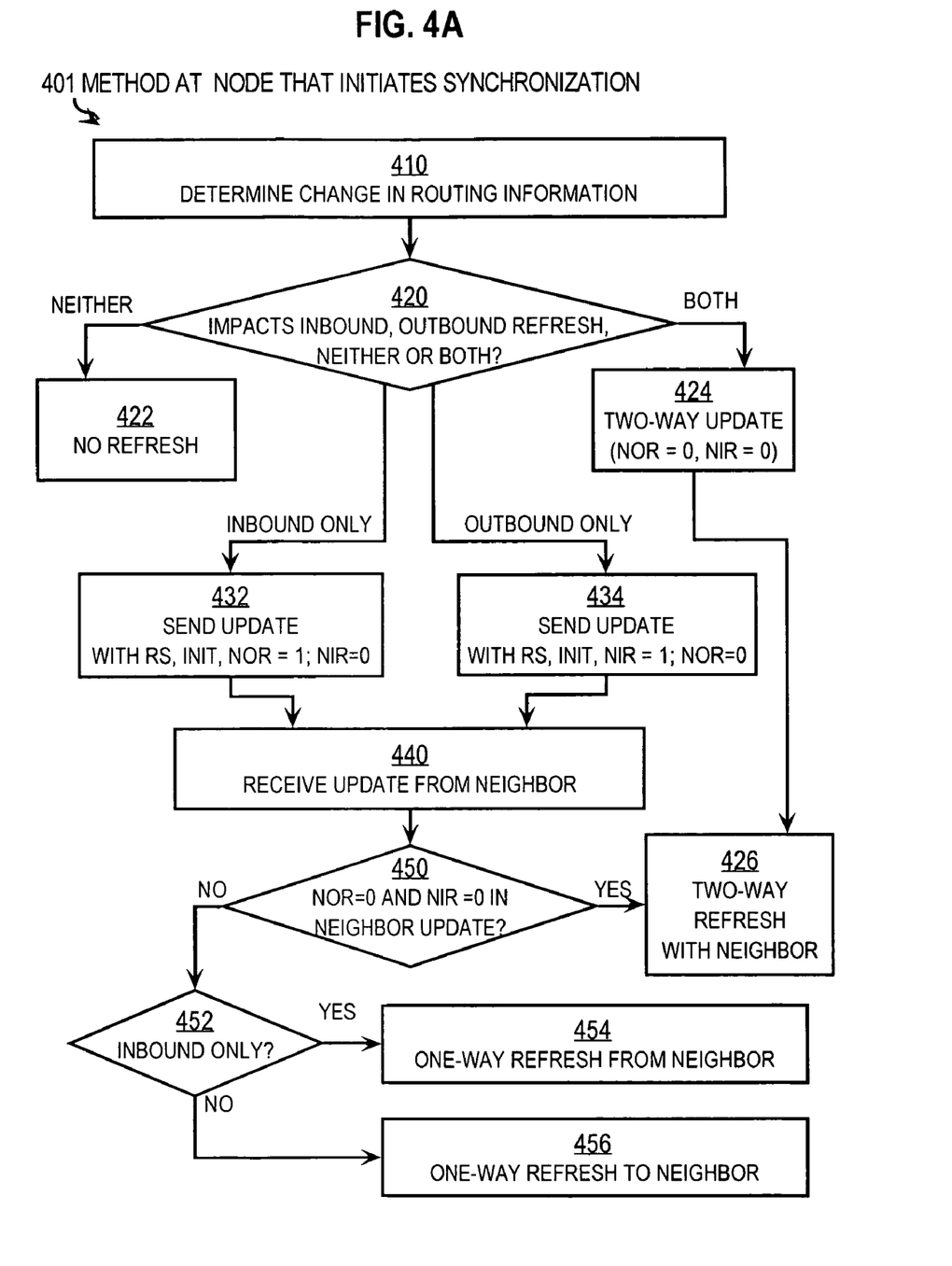
FIG. 4A is a flow diagram that illustrates at a high level a method for initiating refresh of routing data, according to an embodiment.

FIG. 4A is a flow diagram that illustrates at a high level a method 401 for initiating refresh of routing data, according to an embodiment. Although steps in FIG. 4A (and in subsequent flow diagram FIG. 4B) are shown in a particular order for purposes of illustration, in other embodiments one or more steps may be performed in a different order or overlapping in time, or one or more steps may be omitted or added, or some combination of changes may be made.

In step 410, change in routing information is determined at an initiating router. Any change known in the art may be determined during step 410. For example, due to an outbound filter change at router 300, a change occurs in routing table 320. This change affects the routing information to be sent to one or more neighbors. For another example, due to an inbound filter change, routing table information is needed from one or more neighbors so that routing table 320 can be computed again by router 300. Step 410 includes determining a subset of one or more neighbors affected by the change, including all neighbors and less than all neighbors and only one neighbor.

In step 420, it is determined whether the change impacts inbound refresh, outbound refresh, neither or both for each neighbor in the subset. For example, some changes are handled with one or more simple update messages and do not involve a refresh of an entire routing table by either router. In this case control passes to step 422 and no refresh is performed. Step 422 includes performing any updates short of a refresh by either router.

In some cases changes involve a refresh from both the initiating router and at least one neighbor. For example, during GRS/NSF a refresh is needed with every neighbor. In these cases, control passes to step 424. In step 424, two-way refresh is initiated with the neighbor. Any method may be used to perform step 424, including prior art approaches. In the illustrated embodiment, during step 424 update messages 220 and 230 are exchanged with the NOR bit field 222c and the NIR bit field 222d OFF (NOR=0, NIR=0). Control then passes to step 426.

In step 426, two-way refresh is performed with the neighbor. The initiating router 300 sends the contents of routing table 320 in a series of update messages that terminates with an end of routing table code (also known as an end of Routing Information Base or EORIB), and the neighbor sends the contents of its routing table in a series of update messages that terminates with an EORIB.

If it is determined in step 420 that the change impacts inbound refresh only, then control passes to step 432. For example, in some embodiments step 420 includes determining whether a change in cost to a particular route affects an inbound filter at the initiating router that ignores data about a particular destination in the network. If it is determined that a change in cost to the particular route affects the inbound filter, then determining that conditions are satisfied for one-way transfer of routing table data of the neighbor to the initiating router.

In step 432 a refresh-notice message 220 (such as an EIGRP UPDATE message) is sent to the neighbor. In the illustrated embodiment, the message 220 includes the INIT bit field 222a, the RS bit field 222b and the NOR bit field set to 1 (ON). The NIR bit is OFF and has a value of 0. The ON NOR bit field indicates that there is to be No Outbound Refresh from the initiating router. The OFF NIR bit indicates that there is to be an inbound refresh (i.e., not a "No Inbound Refresh") to the initiating router. Control passes to step 440 to receive the response from the neighbor, as described in more detail later below.

If it is determined in step 420 that the change impacts outbound refresh only, then control passes to step 434. For example, in some embodiments step 420 includes determining whether a change in cost to a particular route affects an outbound filter at the initiating router that does not forward to the neighbor data about a particular destination in the network. If it is determined that a change in cost to the particular route affects the outbound filter, then it is determined that conditions are satisfied for one-way transfer of routing table data of the initiating router to the neighbor.

In step 434 a refresh-notice message 220 (such as an EIGRP UPDATE message) is sent to the neighbor. In the illustrated embodiment, the message 220 includes the INIT bit field 222a, the RS bit field 222b and the NIR bit field set to 1 (ON). The NOR bit is OFF and has a value of 0. The ON NIR bit field indicates that there is to be No Inbound Refresh to the initiating router. The OFF NOR bit indicates that there is to be an outbound refresh (i.e., not a "No Outbound Refresh") from the initiating router. Control passes to step 440 to receive the response from the neighbor.

In step 440 a refresh-response message 230 (such as an EIGRP UPDATE message) is received from the neighbor. In the illustrated embodiment, the message 230 includes the INIT bit field 222a OFF, the RS bit field 222b ON. The NOR bit field 222c and NIR bit field 222d are ON or OFF depending on circumstances. The initiating router action is determined by how the NOR and NIR bits are set, as described in the following steps.

In step 450 it is determined whether both the NIR bit and the NOR are OFF. Such a circumstance is expected when the neighbor does not support one-way transfer, such as a neighbor that implements a preceding version of the protocol, such as a preceding version of EIGRP. If this is the case, then the response is taken as an indication of acknowledgement by the neighbor of a default refresh, which is a two-way refresh. Thus, in the illustrated embodiment, if it is determined that both the NIR bit and the NOR bit in fields 222c and 222d, respectively, are OFF, then control passes to step 426. As described above, in step 426, two-way refresh of routing table data is performed in a series of messages ending in EORIB codes. In some embodiments with networks that do not include routers that implement a preceding version of the protocol, step 450 is omitted.

In some embodiments, step 450 includes determining whether both the NIR bit and the NIR bit are ON. Such a circumstance could occur in embodiments in which the neighbor does support one-way transfer but has determined to overrule the decision made in step 420 and force the initiating router to engage in a two-way refresh. For example, a neighbor determines that it needs a refresh from the initiating router but before sending a refresh-notice message, the neighbor receives a refresh-notice message from the initiating router. In this case then, the response is taken as an indication of acknowledgement by the neighbor of a two-way refresh. Control then passes to step 426, described above. In some embodiments, including the illustrated embodiment described below with reference to FIG. 4B, no circumstances are allowed in which both the NOR and NIR bit are ON.

If it is determined, in step 450, that one, but not both, of the NIR bit and the NOR bit is ON, in fields 222c and 222d, respectively, then control passes to step 452. In step 452, it is determined whether the NIR bit or the NOR bit is ON to indicate only inbound refresh to the initiating router. In the illustrated embodiment, a one-way refresh inbound to the initiating router is indicated by a one-way outbound refresh from the neighbor which sent the refresh-response message 230. A one-way outbound refresh from the neighbor is indicted by NIR=1 and NOR=0. In these embodiments, step 452 includes determining whether NIR=1. In some embodiments, the NIR and NOR bits just parrot the values received in the refresh-notice message 220, and one-way inbound refresh is indicated by No Outbound Refresh, i.e., by NOR=1.

If it is determined, in step 452, that the NIR bit or the NOR bit are set to indicate only inbound refresh to the initiating router, then control passes to step 454. In step 454 a one-way refresh from the neighbor to the initiating router is performed. The neighbor sends the contents of its routing table in a series of update messages that terminates with an EORIB; but, the initiating router does not sent its routing table data.

If it is determined, in step 452, that the NIR bit or the NOR bit are not set to indicate only inbound refresh to the initiating router, then it is determined that only outbound refresh from the initiating router is to be performed, and control passes to step 456. In step 456 a one-way refresh from the initiating router to the neighbor is performed. The initiating router sends the contents of its routing table in a series of update messages that terminates with an EORIB; but, the neighbor does not send its routing table data.

In some embodiments, the one-way direction indicated by the NOR and NIR bits in fields 222c, 222d, respectively, in the refresh-response message 230 do not match the one-way direction specified in the refresh-notice message 220 sent by the initiating router. In the illustrated embodiment, this circumstance does not arise (see FIG. 4B, described below). In various embodiments, in which such a circumstance does arise, further steps (not shown) may be taken. For example, in some such embodiments, control passes back to step 420 to determine again whether the change impacts inbound refresh, outbound refresh, neither or both based on additional information in the refresh-response message 230 received in step 440.

Figure 4B:
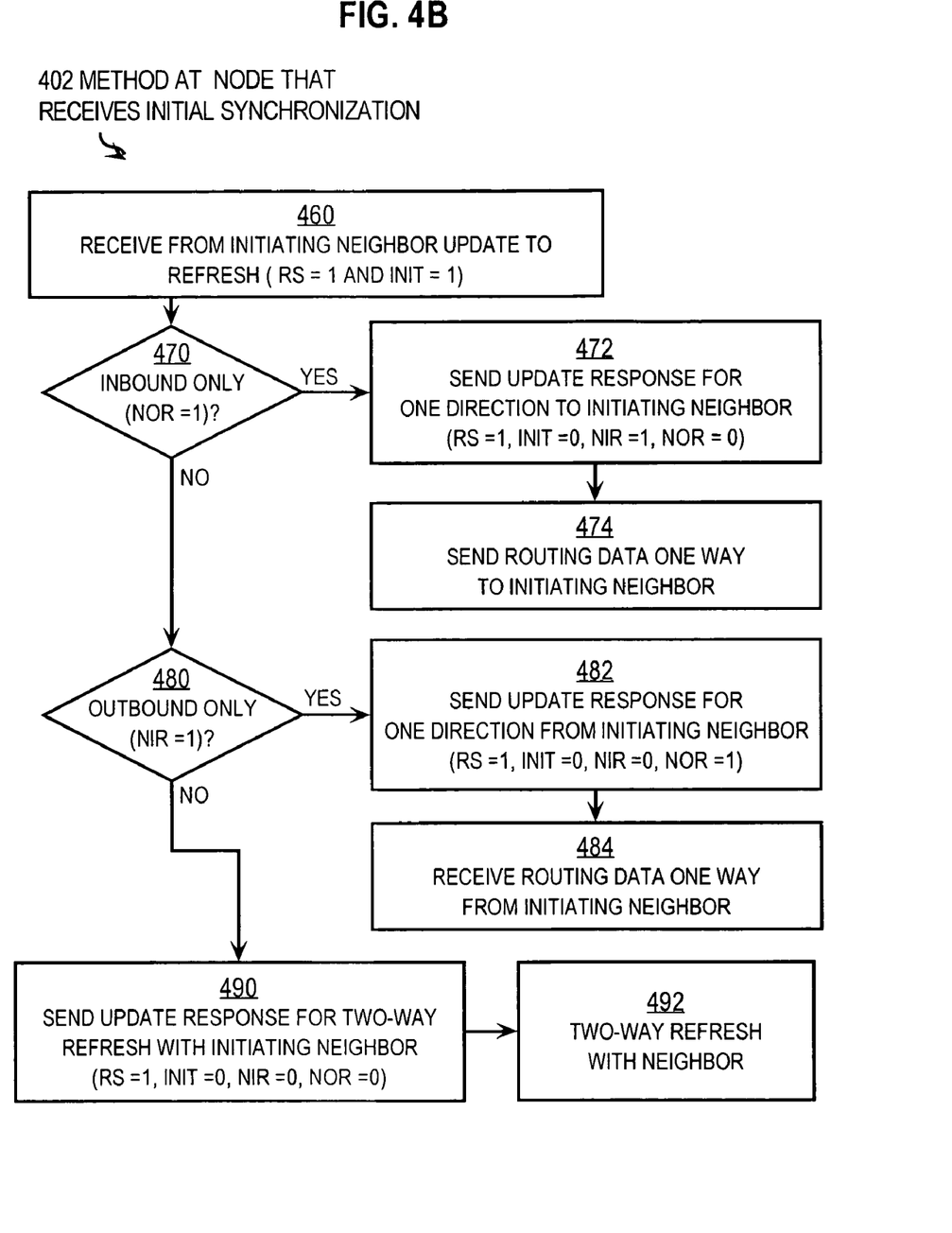
FIG. 4B is a flow diagram that illustrates at a high level a method for responding to notice of refresh of routing data, according to an embodiment.

FIG. 4B is a flow diagram that illustrates at a high level a method 402 for responding to notice of refresh of routing data, according to an embodiment. In some embodiments, method 402 is performed by a different process than is step 401. In the illustrated embodiment, process 314 performs both method 401 and method 402.

In step 460, a refresh-notice message 220 is received, such as an EIGRP UPDATE message, from an initiating router. In the illustrated embodiment, the message 220 includes the INIT bit field 222a and the RS bit field 222b set to 1 (ON), and either the NOR bit field 222c or the NIR bit field 222d or neither, but not both, set to 1 (ON).

In step 470, it is determined whether the refresh-notice is for a one-way refresh inbound to the initiating router that sent message 220. If so, control passes to step 472. In the illustrated embodiment, a one-way refresh inbound to the initiating router is indicated by the NOR bit field 222c set to 1 (ON). Thus if NOR bit field 222c holds a NOR=1, then control passes to step 472.

In step 472, a refresh-response message 230 (such as an EIGRP UPDATE message) is formed and sent to the initiating router. In the illustrated embodiment, the message 230 includes the INIT bit field 232a OFF (INIT=0) and the RS bit field 232b ON (RS=1), and the NOR bit field 222c OFF (NOR=0) and the NIR bit field 222d ON (NIR=1). The ON NIR bit indicates that there is to be No Inbound Refresh to the receiving router. The off NOR bit indicates that there is to be an outbound refresh (i.e., not a "No Outbound Refresh") from the receiving router to the initiating router. Control passes to step 474.

In step 474 a one-way refresh from the receiving router to the initiating router is performed. The receiving router sends the contents of its routing table in a series of update messages that terminates with an EORIB; but, the initiating router does not sent its routing table data.

If it is determined, in step 470, that the refresh-notice is not for a one-way refresh inbound to the initiating router that sent message 220, then control passes to step 480. In step 480, it is determined whether the refresh-notice is for a one-way refresh outbound from the initiating router that sent message 220. If so, control passes to step 482. In the illustrated embodiment, a one-way refresh outbound from the initiating router is indicated by the NIR bit field 222c set to 1 (ON). Thus if NIR=1, then control passes to step 482.

In step 482, a refresh-response message 230 (such as an EIGRP UPDATE message) is formed and sent to the initiating router. In the illustrated embodiment, the message 230 includes the INIT bit field 232a set to OFF (INIT=0) and the RS bit field 232b set to ON (RS=1), and the NOR bit field 222c set to ON (NOR=1) and the NIR bit field 222d OFF (NIR=0). The ON NOR bit indicates that there is to be No Outbound Refresh from the receiving router. The off NIR bit indicates that there is to be an inbound refresh (i.e., not a "No Inbound Refresh") to the receiving router from the initiating router. Control passes to step 484.

In step 484 a one-way refresh from the initiating router to the receiving router is performed. The initiating router sends the contents of its routing table in a series of update messages that terminates with an EORIB; but, the receiving router does not sent its routing table data.

If it is determined in step 480 that the refresh-notice is not for a one-way refresh outbound from the initiating router that sent message 220, then control passes to step 490. In step 490 a refresh-response message 230 (such as an EIGRP UPDATE message) is formed and sent to the initiating router. In the illustrated embodiment, the message 230 includes the INIT bit field 232a set to OFF (INIT=0) and the RS bit field 232b set to ON (RS=1), and both the NOR bit field 222c and NIR bit field 222d set to OFF (NOR=0, NIR=0). The OFF NOR bit and OFF NIR bit indicate that there is to be two-way refresh. Control passes to step 492. In step 492, a two-way refresh is performed, as in the prior art approach.

Using method 401 and method 402, one-way refresh of routing table data is performed as circumstances warrant. This reduces the consumption of router processing and link bandwidth resources compared to current methods; and noticeably improves network performance.

4.0 Implementation Mechanisms—Hardware Overview

Figure 5:
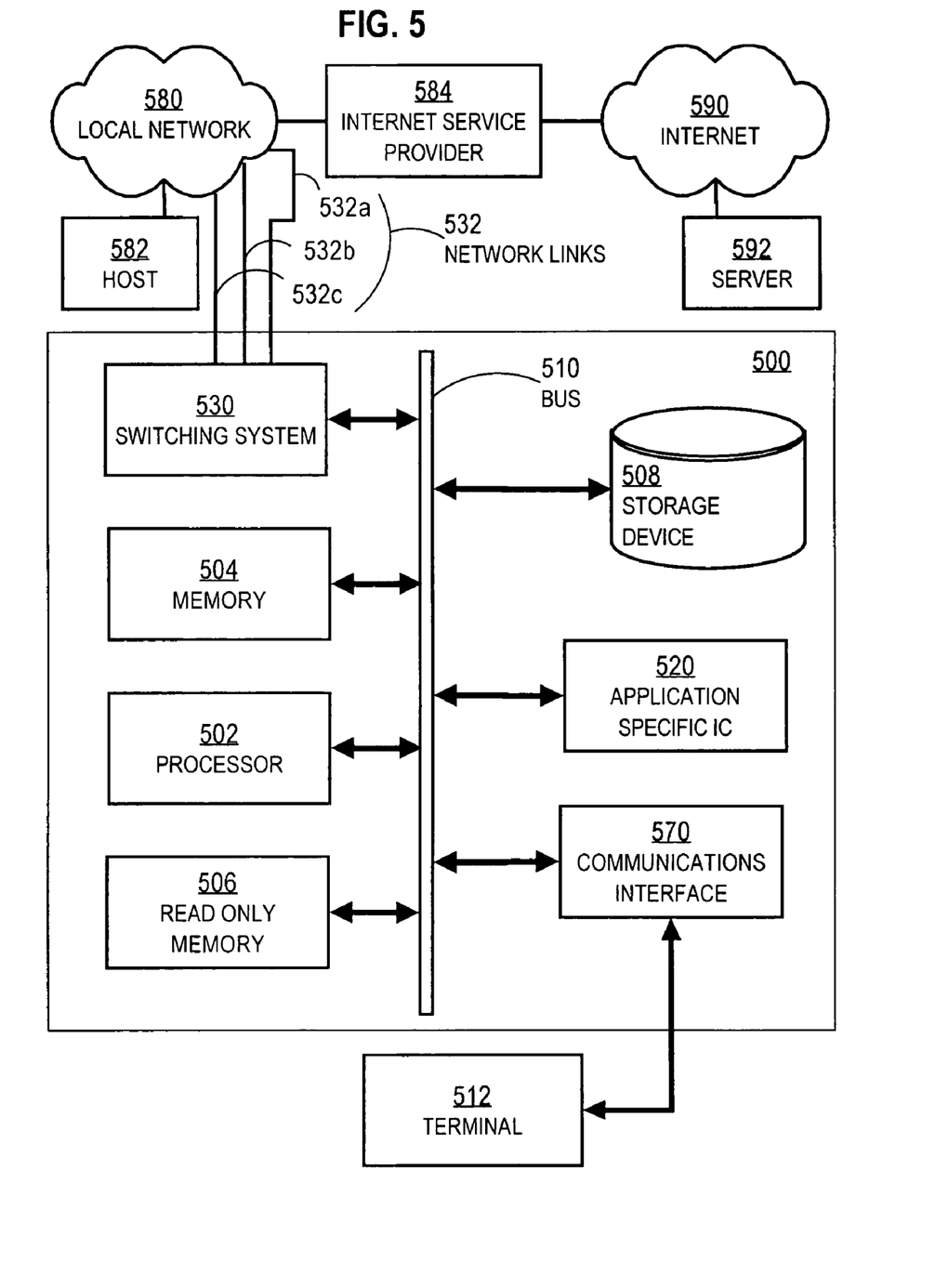
FIG. 5 is a block diagram that illustrates a router upon which an embodiment of the invention may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for synchronizing routing data in a packet-switched communications network, comprising the steps of:
   determining at an initiating router whether conditions are satisfied for one way transfer of routing table data of a particular node with an adjacent router, wherein the routing table data of the particular node indicates for each destination in a network, a cost of reaching that destination from the particular node, and the adjacent router communicates with the initiating router without an intervening intermediate network node; and
   if it is determined that conditions are satisfied for one way transfer of routing table data with the adjacent router, then performing the steps of:
      sending a refresh-notice message from the initiating router to the adjacent router, wherein the refresh-notice message includes data that indicates a particular direction for transfer of routing table data;
      if the particular direction is inbound, then receiving a copy of an adjacent routing table of the adjacent router without sending a copy of an own routing table of the initiating router, and
      if the particular direction is outbound, then sending a copy of the own routing table of the initiating router without receiving a copy of the adjacent routing table of the adjacent router.

2. A method as recited in claim 1, wherein:
   the method further comprises receiving a refresh-response message from the adjacent router; and
   determining whether the refresh-response message indicates the particular direction for transfer of routing table data, whereby the method is backward compatible with an adjacent router that does not process information about the particular direction for transfer of routing table data but always does a two-way exchange of routing table data during a refresh.

3. A method as recited in claim 2, said step of receiving the refresh-response message further comprising receiving the refresh-response message, wherein the refresh-response message includes a first bit and a second bit, only one of which is ON to indicate a second direction for transfer of routing table data supported by the adjacent router.

4. A method as recited in claim 3, wherein neither the first bit nor the second bit is ON to indicate two-way exchange of routing table data between the initiating router and the adjacent router.

5. A method as recited in claim 4, said step of determining whether the refresh-response message indicates the particular direction for transfer of routing table data further comprising determining whether the second direction agrees with the particular direction.

6. A method as recited in claim 1, further comprising the step of determining the adjacent router from a subset of less than all of a plurality of routers that are also adjacent routers that communicate with the initiating router without an intervening node.

7. A method as recited in claim 1, said step of determining at the initiating router whether conditions are satisfied for one-way transfer of routing table data further comprising the steps of:
- determining whether a change in cost of reaching a particular destination affects an inbound filter at the initiating router, wherein the inbound filter ignores data about a filtered destination in the network; and
- if it is determined that the change in cost of reaching the particular destination affects the inbound filter, then determining that conditions are satisfied for one-way transfer of routing table data of the adjacent router to the initiating router.

8. A method as recited in claim 1, said step of determining at the initiating router whether conditions are satisfied for one-way transfer of routing table data further comprising the steps of:
- determining whether a change in cost of reaching a particular destination affects an outbound filter at the initiating router, wherein the outbound filter does not forward to the adjacent router data about a filtered destination in the network; and
- if it is determined that the change in cost of reaching the particular destination affects the outbound filter, then determining that conditions are satisfied for one-way transfer of routing table data of the initiating router to the adjacent router.

9. A method as recited in claim 1, said step of sending the refresh-notice message further comprising sending the refresh-notice message, wherein the refresh-notice message includes a first bit and a second bit, only one of which is ON to indicate the particular direction for transfer of routing table data.

10. A method as recited in claim 9, wherein neither first bit nor the second bit is ON to indicate two-way exchange of routing table data between the initiating router and the adjacent router.

11. A method for synchronizing routing data in a packet-switched communications network, comprising the steps of:
- receiving, at an adjacent router from an initiating router, a refresh-notice message that includes data that indicates a particular direction for transfer of routing table data between the adjacent router and the initiating router;
- determining whether the particular direction is acceptable based on the refresh-notice message; and
- sending a refresh-response that includes data that indicates the particular direction if acceptable or data that indicates another direction if unacceptable, wherein
- the routing table data of a particular router indicates a cost of reaching a destination in the packet-switched communications network from the particular router,
- the adjacent router communicates with the initiating router without an intervening intermediate router, and
- the refresh-notice message and the refresh-response message further includes a first bit and a second bit, only one of which is ON to indicate a direction for transfer of routing table data from the adjacent router to the initiating router or from the initiating router to the adjacent router.

12. A method as recited in claim 11, further comprising the steps of:
- if the particular direction is inbound at the initiating router, then receiving a copy of an adjacent routing table of the adjacent router without sending a copy of an own routing table of the initiating router, and
- if the particular direction is outbound at the initiating router, then sending a copy of the own routing table of the initiating router without receiving a copy of the adjacent routing table of the adjacent router.

13. A method as recited in claim 11, wherein neither the first bit nor the second bit is ON to indicate two-way exchange of routing table data between the initiating router and the adjacent router.

14. A method as recited in claim 11, said step of sending the refresh-response message further comprising sending the refresh-response message, wherein the refresh-response message includes a first bit and a second bit, only one of which is ON to indicate the particular direction for transfer of routing table data supported by the adjacent router.

15. A method as recited in claim 14, wherein neither the first bit nor the second bit is ON to indicate two-way exchange of routing table data between the initiating router and the adjacent router.

16. An apparatus for synchronizing routing data in a packet-switched communications network, comprising:
- means for determining at an initiating router whether conditions are satisfied for one way transfer of routing table data of a particular node with an adjacent router, wherein the routing table data of the particular node indicates for each destination in a network, a cost of reaching that destination from the particular node, and the adjacent router communicates with the initiating router without an intervening intermediate network node;
- means for sending a refresh-notice message from the initiating router to the adjacent router, wherein the refresh-notice message includes data that indicates a particular direction for transfer of routing table data, if it is determined that conditions are satisfied for one way transfer of routing table data with the adjacent router; and
- means for, if it is determined that conditions are satisfied for one way transfer of routing table data with the adjacent router, then receiving a copy of an adjacent routing table of the adjacent router without sending a copy of an own routing table of the initiating router if the particular direction is inbound, and sending a copy of the own routing table of the initiating route without receiving a copy of the adjacent routing table of the adjacent router if the particular direction is outbound.

17. An apparatus for synchronizing routing data in a packet-switched communications network, comprising:
- one or more network interfaces coupled to a network for communicating therewith a first data packet;
- one or more processors;
- one or more computer-readable media; and one or more sequences of instructions stored in the computer-readable media, which, when executed by the one or more processors, causes the one or more processors to carry out the steps of:

determining whether conditions are satisfied for one way transfer of routing table data of a particular node with an adjacent router, wherein the routing table data of the particular node indicates for each destination in a network, a cost of reaching that destination from the particular node, and the adjacent router communicates through the one or more network interfaces without an intervening intermediate network node; and if it is determined that conditions are satisfied for one way transfer of routing table data with the adjacent router, then performing the steps of:

sending a refresh-notice message to the adjacent router, wherein the refresh-notice message includes data that indicates a particular direction for transfer of routing table data;

if the particular direction is inbound, then receiving a copy of an adjacent routing table of the adjacent router without sending a copy of an own routing table of the initiating router; and if the particular direction is outbound, then sending a copy of the own routing table of the initiating router without receiving a copy of the adjacent routing table of the adjacent router.

18. An apparatus as recited in claim 17, wherein:

execution of the one or more sequences of instructions further causes the one or more processors to carry out the step of receiving a refresh-response message from the adjacent router; and determining whether the refresh-response message indicates the particular direction for transfer of routing table data, whereby the method is backward compatible with an adjacent router that does not process information about the particular direction for transfer of routing table data but always does a two-way exchange of routing table data during a refresh.

19. An apparatus as recited in claim 18, said step of receiving the refresh-response message further comprising receiving the refresh-response message, wherein the refresh-response message includes a first bit and a second bit, only one of which is ON to indicate a second direction for transfer of routing table data supported by the adjacent router.

20. An apparatus as recited in claim 19, wherein neither the first bit nor the second bit is ON to indicate two-way exchange of routing table data between the apparatus and the adjacent router.

21. An apparatus as recited in claim 20, said step of determining whether the refresh-response message indicates the particular direction for transfer of routing table data further comprising determining whether the second direction agrees with the particular direction.

22. An apparatus as recited in claim 17, wherein execution of the one or more sequences of instructions further causes the one or more processors to carry out the step of determining the adjacent router from a subset of less than all of a plurality of routers that are also adjacent routers that communicate with the apparatus without an intervening node.

23. An apparatus as recited in claim 17, said step of determining whether conditions are satisfied for one-way transfer of routing table data further comprising the steps of:

determining whether a change in cost of reaching a particular destination affects an inbound filter at the apparatus, wherein the inbound filter ignores data about a filtered destination in the network; and if it is determined that the change in cost of reaching the particular destination affects the inbound filter, then determining that conditions are satisfied for one-way transfer of routing table data of the adjacent router to the apparatus.

24. An apparatus as recited in claim 17, said step of determining whether conditions are satisfied for one-way transfer of routing table data further comprising the steps of:

determining whether a change in cost of reaching a particular destination affects an outbound filter at the apparatus, wherein the outbound filter does not forward to the adjacent router data about a filtered destination in the network; and if it is determined that the change in cost of reaching the particular destination affects the outbound filter, then determining that conditions are satisfied for one-way transfer of routing table data of the apparatus to the adjacent router.

25. An apparatus as recited in claim 17, said step of sending the refresh-notice message further comprising sending the refresh-notice message, wherein the refresh-notice message includes a first bit and a second bit, only one of which is ON to indicate the particular direction for transfer of routing table data.

26. An apparatus as recited in claim 25, wherein neither the first bit nor the second bit is ON to indicate two-way exchange of routing table data between the apparatus and the adjacent router.

27. An apparatus for synchronizing routing data in a packet-switched communications network, comprising:

one or more network interfaces coupled to the packet-switched communications network for communicating data;

one or more processors;

one or more computer-readable media;

one or more data structures stores one the one or more computer-readable media for holding routing table data; and one or more sequences of instructions stored in the computer-readable media, which, when executed by the one or more processors, causes the one or more processors to carry out the steps of:

receiving, from an initiating router, a refresh-notice message, determining whether a particular direction is acceptable based on the refresh-notice message; and sending a refresh-response message that includes data that indicates the particular direction if acceptable or data that indicates another direction if unacceptable, wherein the refresh-notice message includes data that indicates a particular direction for transfer of routing table data between the adjacent router and the initiating router, the routing table data of a particular router indicates, for each destination in the packet-switched communications network, a cost of reaching that destination from the particular router, the apparatus communicates with the initiating router through the one or more network interfaces without an intervening intermediate router, and the refresh-notice message and the refresh-response message further includes a first bit and a second bit, only one of which is ON to indicate a direction for transfer of routing table data from the adjacent router to the initiating router or from the initiating router to the adjacent router.

28. An apparatus as recited in claim 27, execution of the one or more sequences of instructions further causes the one or more processors to carry out the steps of:
- if the particular direction is inbound at the initiating router, then receiving a copy of an adjacent routing table of the adjacent router without sending a copy of an own routing table of the initiating router; and
- if the particular direction is outbound at the initiating router, then sending a copy of the own routing table of the initiating router without receiving a copy of the adjacent routing table of the adjacent router.

29. An apparatus as recited in claim 27, wherein neither the first bit nor the second bit is ON to indicate two-way exchange of routing table data between the initiating router and the apparatus.

30. An apparatus as recited in claim 27, said step of sending the refresh-response message further comprising sending the refresh-response message, wherein the refresh-response message includes a first bit and a second bit, only one of which is ON to indicate the particular direction for transfer of routing table data supported by the apparatus.

31. An apparatus as recited in claim 30, wherein neither the first bit nor the second bit is ON to indicate two-way exchange of routing table data between the initiating router and the apparatus.

* * * * *